United States Patent
Huang et al.

(10) Patent No.: US 11,522,953 B1
(45) Date of Patent: Dec. 6, 2022

(54) HUMAN-CYBER-PHYSICAL RESOURCE-ORIENTED ADAPTIVE CONSTRUCTION METHOD AND APPARATUS FOR STRUCTURED P2P NETWORK

(71) Applicant: PEKING UNIVERSITY, Beijing (CN)

(72) Inventors: Gang Huang, Beijing (CN); Huaqian Cai, Beijing (CN); Xuanzhe Liu, Beijing (CN); Yun Ma, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/752,810

(22) Filed: May 24, 2022

(30) Foreign Application Priority Data

Oct. 18, 2021 (CN) .......................... 202111207252.8

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 67/104* | (2022.01) | |
| *H04L 67/1061* | (2022.01) | |

(52) U.S. Cl.
CPC ...... *H04L 67/1046* (2013.01); *H04L 67/1065* (2013.01)

(58) Field of Classification Search
CPC ................. H04L 67/1046; H04L 67/1065
USPC ....................................................... 709/223
See application file for complete search history.

(56) References Cited

U.S. PATENT DOCUMENTS

| | | | | |
|---|---|---|---|---|
| 10,986,173 | B1 * | 4/2021 | Thomason | H04L 67/1021 |
| 10,986,184 | B1 * | 4/2021 | Seymour | H04L 67/104 |
| 11,089,083 | B1 * | 8/2021 | Thomason | H04W 40/20 |
| 11,310,305 | B1 * | 4/2022 | Thomason | H04L 61/4511 |
| 2016/0203522 | A1 * | 7/2016 | Shiffert | G06Q 30/0267 |
| | | | | 705/14.58 |

FOREIGN PATENT DOCUMENTS

CN           104618506 A       5/2015

OTHER PUBLICATIONS

Wu Jin-Hui, et al., Self-organizing multi-hierarchical super-peer topology construction, Computer Engineering and Design, 2016, pp. 3175-3180, vol. 37, No. 12.

\* cited by examiner

*Primary Examiner* — Hamza N Algibhah
(74) *Attorney, Agent, or Firm* — Bayramoglu Law Offices LLC

(57) ABSTRACT

A human-cyber-physical resource-oriented adaptive construction method and apparatus for a structured peer-to-peer (P2P) network are provided. The structured P2P network is a point-to-point network with physical perception information and can be effectively used in a human-cyber-physical fusion scenario. The method includes: using a grid aggregation algorithm to calculate the latitude and longitude coordinates of a new node to acquire a position hash value of the new node; determining, according to the position hash value, a registration node of the new node from the existing nodes of the structured P2P network; and completing, according to the information returned by the registration node to the new node, registration of the new node, thereby resulting adding of the registered new node into the structured P2P network.

8 Claims, 4 Drawing Sheets

HUMAN-CYBER-PHYSICAL RESOURCE-ORIENTED ADAPTIVE CONSTRUCTION METHOD AND APPARATUS FOR STRUCTURED P2P NETWORK

CROSS REFERENCE TO THE RELATED APPLICATIONS

This application is based upon and claims priority to Chinese Patent Application No. 202111207252.8 filed on Oct. 18, 2021, the entire contents of which are incorporated herein by reference.

TECHNICAL FIELD

The present application relates to the technical field of peer-to-peer (P2P) technology, in particular to a human-cyber-physical resource-oriented adaptive construction method and apparatus for a structured P2P network.

BACKGROUND

In a human-cyber-physical fusion environment, the providers and the users of resources are multiple subjects. The provision and use of a resource will cause a trust issue. The using process of a resource is recorded on a blockchain for tracing later if disputes occur, so that the trust issue in a human-cyber-physical fusion scenario can be effectively avoided. A traditional blockchain with a chain structure has low efficiency in generating blocks, and cannot satisfy a situation in which human-cyber-physical resources are frequently used since there are many users. In the related art, it is proposed to replace the chain structure with a graph structure. Different from the chain structure, in the blockchain with the graph structure, each block includes multiple predecessor blocks and subsequent blocks, and a random consensus algorithm is used to validate the blocks, so that a single node randomly stores part of block data, resulting in unknown storage positions for the block data, and it is impossible to quickly locate and acquire block data queried by a user.

In this regard, a structured network (Kademlia) based on a distributed hash table is proposed. The Kademlia uses an XOR distance between two nodes for convergence to solve the problem in a query of distributed ledgers. However, the XOR distance between two nodes in the Kademlia is a logical distance between the nodes, and the two nodes with the shortest logical distance are not the geographically closest nodes.

In the human-cyber-physical fusion scenario, the use of resources on demand is an important feature, and people need to quickly acquire a resource acquisition service that is geographically close to them. In the existing structured network (Kademlia), it is difficult for people to search nodes that are geographically close to them to acquire services. Therefore, quickly finding geographically close nodes is one of the urgent needs to use blockchain technology to realize the human-cyber-physical fusion scenario.

SUMMARY

Embodiments of the present application provide a human-cyber-physical resource-oriented adaptive construction method and apparatus for a structured P2P network, and aims to adaptively construct a structured P2P network. The structured P2P network is a point-to-point network with physical perception information and can be effectively used in a human-cyber-physical fusion scenario to solve the above technical problems.

The first aspect of an embodiment of the present application provides a human-cyber-physical resource-oriented adaptive construction method for a structured P2P network. The method includes:

using a grid aggregation algorithm to calculate latitude and longitude coordinates of a new node to acquire a position hash value of the new node;

determining, according to the position hash value, a registration node of the new node from existing nodes of the structured P2P network; and completing, according to the information returned by the registration node to the new node, registration of the new node, and adding the registered new node into the structured P2P network.

Optionally, after determining a registration node of the new node, the method further includes:

driving the registration node to initiate a reverse search for the new node; and recording, by the registration node, a node list of a skip node, where the skip node is at least one node that the registration node passes through in the process of searching the new node; and the completing, according to the information returned by the registration node, registration of the new node includes:

completing, according to the node list returned by the registration node, registration of the new node.

Optionally, the step of completing, according to the node list returned by the registration node, registration of the new node includes:

acquiring a plurality of candidate nodes from the node list;

selecting, according to distances between the plurality of candidate nodes and the new node, the node list to determine a neighboring node; and storing node information of the new node to the neighboring node to complete registration of the new node, where the node information of the new node includes: the position hash value, a node port number, and a node identifier.

Optionally, when the new node is a resource node, the method further includes:

sending parameter information of the resource node to a node center (NC) node;

determining, by the NC node according to the parameter information, a resource network type to which the resource node belongs;

acquiring a resource network hash value calculated, for the resource node, by the NC node; and determining, according to the resource network hash value, a hash value placement position of the resource node; and adding the registered new node into the structured P2P network includes:

adding the resource node into the structured P2P network according to the hash value placement position.

Optionally, the step of determining, according to the position hash value, a registration node of the new node from existing nodes of the structured P2P network includes:

sending the position hash value to an NC node that stores a plurality of resource network hash values;

determining, by the NC node according to the position hash value, a target resource network hash value from the plurality of resource network hash values; and determining a node with the target resource network hash value as the registration node.

The second aspect of an embodiment of the present application provides a human-cyber-physical resource-oriented adaptive construction apparatus for a structured P2P network. The apparatus includes:

a calculation module configured to use a grid aggregation algorithm to calculate latitude and longitude coordinates of a new node to acquire a position hash value of the new node;

a registration node determination module configured to determine, according to the position hash value, a registration node of the new node from existing nodes of the structured P2P network; and a registration module configured to complete, according to the information returned by the registration node to the new node, registration of the new node, and add the registered new node into the structured P2P network.

Optionally, the apparatus further includes:

a driving module configured to drive the registration node to initiate a reverse search for the new node; and a recording module configured to record, by the registration node, a node list of a skip node, where the skip node is at least one node that the registration node passes through in the process of searching the new node; and the registration module includes:

a first registration sub-module configured to complete, according to the node list returned by the registration node, registration of the new node.

Optionally, the registration sub-module includes:

an acquisition unit configured to acquire a plurality of candidate nodes from the node list;

a selecting unit configured to select, according to distances between the plurality of candidate nodes and the new node, the node list to determine a neighboring node; and a storage unit configured to store node information of the new node to the neighboring node to complete registration of the new node, where the node information of the new node includes: the position hash value, a node port number, and a node identifier.

Optionally, the apparatus further includes:

a sending module configured to send parameter information of the resource node to an NC node;

a network type determination module configured to determine, by the NC node according to the parameter information, a resource network type to which the resource node belongs;

an acquisition module configured to acquire a resource network hash value calculated, for the resource node, by the NC node; and an information determination module configured to determine, according to the resource network hash value, a hash value placement position of the resource node; and the registration module includes:

a second registration sub-module configured to add, according to the hash value placement position, the resource node into the structured P2P network.

Optionally, the registration node determination module includes:

a sending sub-module configured to send the position hash value to an NC node that stores a plurality of resource network hash values;

a hash value determination sub-module configured to determine, by the NC node according to the position hash value, a target resource network hash value from the plurality of resource network hash values; and a registration node determination sub-module configured to determine a node with the target resource network hash value as the registration node.

In the embodiments of the present application, a grid aggregation algorithm is used to calculate, according to the longitude and latitude coordinates of a new node, a position hash value of the new node; a node relatively closer to the new node is determined, according to the position hash value, from existing nodes of the structured P2P network; the relatively closer node is used as a registration node; the new node then sends a registration request to the registration node, so that the registration node performs a reverse search on the new node, thus obtaining a neighboring node of the new node in a geographic position; after the new node receives a node list of the neighboring node sent by the registration node, an actual neighboring node is selected out from the node list; and node information of the new node is stored to the neighboring node. In this way, a connection relationship between the new node and an existing node of the structured P2P network is established, and a storage structure for the new node in the structured P2P network is also established. Connection relationships and storage structures of all the nodes are established in sequence according to the above method, and the structured P2P network of the embodiments of the present application is adaptively constructed. Furthermore, in the structured P2P network constructed in the above method, adjacent nodes are exactly nodes that are adjacent in actual geographic positions, so that a user can use a Kademlia distributed search method to initiate, at any node of the structured P2P network, a search for other nodes. In this way, searched resource nodes are exactly nodes that are close in geographic positions, so services can be obtained in time.

Figure 1:
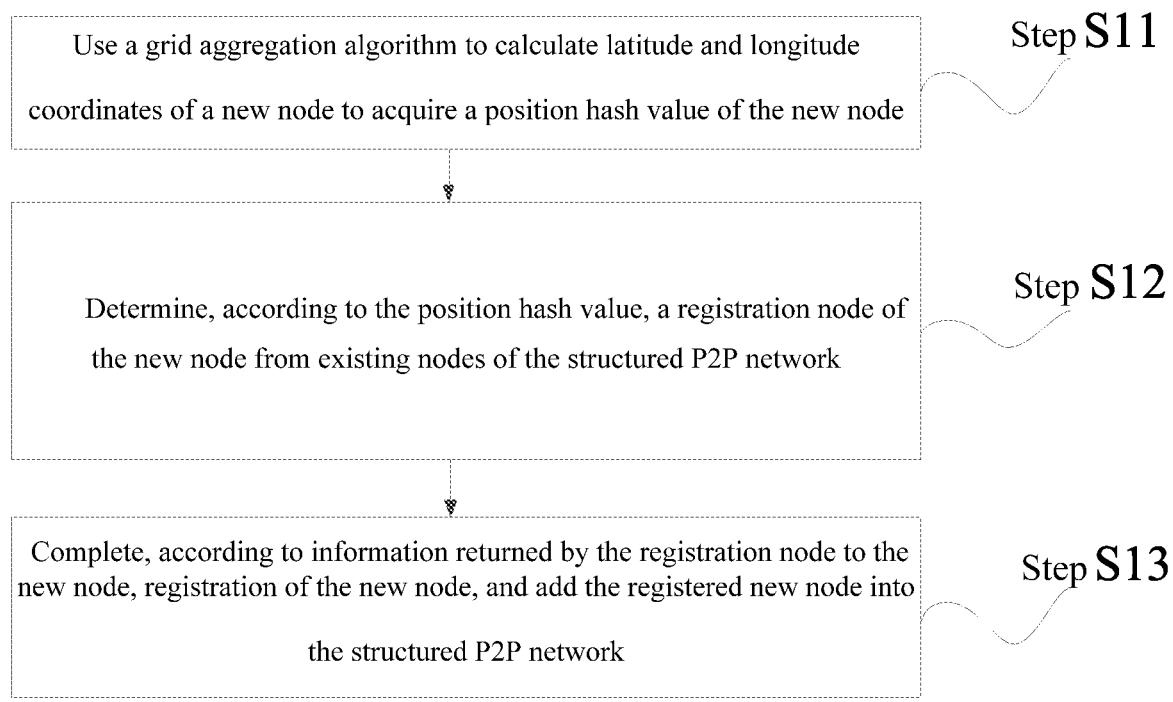
FIG. 1 is a flowchart of steps of a human-cyber-physical resource-oriented adaptive construction method for a structured P2P network provided in an embodiment of the present application.

Reference numerals in the drawings:

41: calculation module; 42: registration node determination module; and 43: registration module.

DETAILED DESCRIPTION OF THE EMBODIMENTS

The technical solutions in the embodiments of the present application will be described clearly and completely below with reference to the drawings in the embodiments of the present application. Apparently, the embodiments described herein are only part of the embodiments of the present application, not all the embodiments. Based on the embodiments in the present application, all other embodiments obtained by those of ordinary skill in the art without creative work shall fall within the protection scope of the present application.

A distributed ledger is a data storage technology developed on the basis of blockchain technology. The distributed ledger is composed of core technologies such as distributed data storage, point-to-point transmission, a consensus mechanism, and an encryption algorithm; it has the characteristics of decentralization, tampering resistance, and traceability. The emergence of the distributed ledger technology supports a new type of Internet application. Asset digitization, anti-counterfeiting traceability for production and supply chains, and smart home Internet of things are important application scenarios of the distributed ledger technology.

The distributed ledger adopts a random consensus mechanism to validate blocks, nodes are randomly selected to store blocks, and each block includes a plurality of predecessor blocks and subsequent blocks, resulting in low traceability.

In response to the above problems, the related art proposes that based on Kademlia, a Kademlia protocol is a structured P2P overlay network, so a k-bucket node routing table is constructed through unique XOR calculation. For different scenarios, by cooperation with routing mechanisms of three system parameters a, K, and K_bucket, resources can be quickly and efficiently positioned. Compared with the same type of algorithm such as the Chord protocol, the Kademlia protocol uses an asynchronous query request to avoid the timeout response problem caused by a single point failure, thus ensuring that a model can still effectively process requests from different nodes under high-frequency jitter of the nodes, and the Kademlia protocol has better robustness, high accuracy, and the like.

The Kademlia protocol is a structured P2P search designed on the basis of a distributed hash table. Nodes and resource objects are located at certain positions of the logical topological structure according to a consistent hash function. When a resource needs to be queried, an XOR operation is used to compare distance values, and the position of the resource can be quickly and accurately queried by routing search. However, a placement position of the object does not refer to an actual geographic position, that is, the position of a node in a network has absolutely nothing to do with a real geographic position. As a result, neighboring nodes stored in a k-bucket are not true neighboring nodes. Furthermore, short distances obtained by XOR calculation are only logical distance convergence. In the end, although hash values between nodes are close, a routing process needs to traverse a plurality of redundant Internet Service Providers (ISPs), resulting in a large number of access timeouts.

A human-cyber-physical fusion scenario refers to a deep fusion system with the interconnection of all things, which is formed by ubiquitous connections between an Internet and a telecommunications network, a mobile network as well as an Internet of things. Takeaway delivery, shared bicycles, hotel group purchases, etc. are typical human-cyber-physical fusion scenarios. Takeaway delivery is taken as an example, a takeaway platform integrates, according to a current geographic position of an orderer, restaurant resources around the orderer and a deliverer of neighboring restaurant resources, and delivers, according to a rule of meal pickup and delivery services, meals to users to complete a takeaway service. However, in order to achieve a human-cyber-physical fusion scenario at present, service resources, customer resources, and human resources need to be integrated relying on a platform. A smart contract is an agreement that specifies commitments in a digital form, on which contract parties can execute these commitments. The smart contract has the characteristics of self-validation, automatic execution of contract transactions, execution of trusted and secure transactions without a third party, and the like. The above characteristics are in line with the characteristics of decentralization, tamper resistance, and traceability of distributed ledger technology. Therefore, in the present application, a smart contract is applied to a distributed ledger, and any service demander and service provider can join the structured P2P network. For example, a mobile phone of the orderer, a computer at a reception of a restaurant, and a mobile phone of a deliverer can all be nodes of the structured P2P network. The computer at the reception of the restaurant sets a smart contract and publishes service resources. The orderer finds the computer at the reception of the restaurant, invokes the smart contract therein, and acquires a service of the restaurant.

The above process of applying the smart contract to the distributed ledger has the problem that when the orderer searches for a node that can provide a delivery service, it is difficult to find a node that is close to the geographic position of the orderer and is used for providing a service resource.

In view of this, the present application provides a human-cyber-physical resource-oriented adaptive construction method for a structured P2P network, which can construct a structured P2P network with geospatial topology perception, that is, can construct a structured P2P overlay network with geospatial topology perception.

It should be noted that the nodes in the present application may be devices with computing capabilities, such as a computer, a mobile phone, and a tablet. Devices that provide service resources, such as an electrical appliance, can be used as resource nodes, and resource nodes can be connected to or in communication connection to nodes.

FIG. 1 is a flowchart of steps of a human-cyber-physical resource-oriented adaptive construction method for a structured P2P network provided in an embodiment of the present application. As shown in FIG. 1, the steps are as follows:

In step S11: using a grid aggregation algorithm to calculate the latitude and longitude coordinates of a new node to acquire a position hash value of the new node.

The new node itself and other devices with computing capabilities can calculate the new node's position hash value (GeoHash_ID).The grid aggregation algorithm GeoHash is a geographic position encoding mechanism. According to the basic principle, the earth is regarded as a two-dimensional plane. The plane is recursively decomposed into rectangular regions with different sizes according to different cutting accuracies, and each region has the same prefix code within a certain longitude and latitude range.

In the embodiment of the present application, when a topological structure of the structured P2P network is constructed, a position hash value of each node to be added to the structured P2P network is calculated, and each node is mapped to a one-dimensional storage space according to the position hash value of the node, thus forming a Kademlia topological structure with physical perception, and a structure foundation of the structured P2P network of the embodiment of the present application is obtained.

Before the position hash value is mapped to the one-dimensional storage space, two-dimensional longitude and latitude data can also be subjected to dimension reduction. A geographic region where each node is located can also be acquired according to the position hash value.

In the embodiment of the present application, a length of the position hash value adopts 160 bits, so as to ensure that the position hash value conforms to an index value storage space that is large enough and has collision resistance. At the same time, the one-dimensional storage space extends to a 2160 numerical space consistent with the SHA-1 hash function. When a system allocates an index value to a new node that is added to a network, the position hash value calculated by taking the longitudinal and latitude of the node as parameters in combination with the grid aggregation algorithm GeoHash is used as the index value of the new node to map the new node to the one-dimensional storage space.

Nodes are mapped to the one-dimensional storage space sequentially, so that the new node can be mapped to a node in the one-dimensional storage space.

In step S12: determining, according to the position hash value, a registration node of the new node from existing nodes of the structured P2P network.

The existing nodes of the structured P2P network may be nodes which have been mapped to the one-dimensional storage space.

In the present application, specific sub-steps of determining a registration node according to the position hash value are as follows:

In sub-step S121: sending, by the new node, the position hash value to an NC node that stores a plurality of resource network hash values.

The NC node is used for forwarding, in the process of constructing the structured P2P network, the position hash value of each new node and is used for providing, in the process of adding a resource node, a resource network name and a resource network hash value to participate in the formation of different resource networks. After a period of time, the NC node has stored the resource network hash value.

A resource network refers to a network classified by functions of resources in a human-cyber-physical resource scenario, and resource networks belonging to different resource network types are obtained. The resource network includes service resources, client resources, and human resources. The takeaway platform is a typical human-cyber-physical resource example. In this example, the resource network may be a deliverer network and a restaurant network.

In sub-step S122: determining, by the NC node according to the position hash value, a target resource network hash value from the plurality of resource network hash values.

After receiving the position hash value, the NC node searches for a target resource network hash value which is least different from the position hash value from the plurality of pre-stored resource network hash values. The target resource network hash value is a hash value of a resource network composed of a plurality of nodes relatively closer to the new node in geographic positions.

In sub-step S123: determining, by the NC node, a node with the target resource network hash value as a registration node.

The registration node is one of the existing nodes of the structured P2P network, and the position hash value of the node has the highest similarity to the target resource network hash value.

After the registration node is determined, a demand node initiates a registration request to the registration node, so that after the registration node receives the registration request, the registration request is used to drive the registration node to initiate a reverse search for the new node. The demand node is any one of the other search nodes in a preset structured P2P network except a search node that generates a service block. A user can select one of a plurality of computers or mobile terminals connected to the preset structured P2P network as the demand node.

When the new node is a resource node, the NC node names the resource node in a unified way when a new resource node is added into the preset structured P2P network, so that different resource nodes belonging to the same type are aggregated into a resource network. For example, resource node 1 is coffee maker No. 1; resource node 2 is coffee maker No. 2; resource node 3 is bicycle No. 1; coffee maker No. 1 is on a certain street in city C, and a geographic position hash value is wx4cqzb4; coffee maker No. 2 is on a certain street in city C, and a geographic position hash value is wx4cqzf5, and bicycle No. 1 is on a certain street in city C, and a geographic position hash value is wx4cw8y0. Coffee maker No. 1, coffee maker No. 2, and bicycle No. 1 are respectively mapped to the one-dimensional storage space according to the geographic position hash values of the respective resource nodes.

The geographic positions of coffee maker No. 1 and coffee maker No. 2 are close, so they are placed adjacently in the one-dimensional storage space, thus forming a coffee maker resource network of the certain street of city C. wx4cqXXX can be taken as a hash value of the resource network of the coffee maker resource network of the certain street of city C, and a correspondence relationship between the resource network name and the hash value of the resource network is obtained. Correspondence relationships between a plurality of resource network names and the hash value of the resource network are obtained and can be arranged to obtain a preset relationship table. According to the process of aggregating a resource network of a certain district, it can be known that the hash value of the resource network of a certain district is highly similar to the position hash value of each node in the resource network of the certain district. Therefore, in the present application, it is determined, according to the hash value of the resource network, that the obtained registration node is a node relatively closer to the new node. Distributed search is performed on the registration node for a limited number of times so that a neighboring node for the new node can be found.

After determining a registration node of the new node, the embodiment of the present application further provides the following method:

In step A1: driving the registration node to initiate a reverse search for the new node. The registration request sent by the new node to the registration node may include the position hash value of the new node, and the registration node takes the position hash value as an index value, and uses the Kademlia distributed search method to find the new node.

In step A2: recording, by the registration node, a node list of a skip node, where the skip node is at least one node that the registration node passes through in the process of searching the new node.

The registration node initiates the reverse search for the new node, and records, in the process of searching the new node, the nodes that the registration node passes through and the node list of the nodes. The existing nodes in the structured P2P network are stored according to the position hash values, so that when the registration node uses the Kademlia search algorithm to search the new node, it is certain that the neighboring nodes to the registration node in the geographic position are queried, that is, the skip node of the registration node is at least one node close to the registration node in the geographic position. The node list is a K-bucket of any node, in which a geographic position hash value of a neighboring node of any node, a node IP, a smart contract stored in the node, and other information are stored.

In step S13: completing, according to the information returned by the registration node to the new node, registration of the new node, thereby resulting adding of the registered new node into the structured P2P network.

The information returned by the registration node to the new node includes the node list of the skip node, the distance between the skip node and the new node, and the availability of the skip node.

Specifically, a specific implementation of step S13 may be: completing, according to the node list returned by the registration node, and the registration of the new node. That is the new node stores, according to the node list of at least one node returned by the registration node and the distance from the at least one node, its node information to the node list of at least one node returned by the registration node, so as to store the node information of the new node to the existing node of the structured P2P network. Furthermore, the existing node that stores the information of the new node is a node close to the new node in both the topological structure and the actual geographic position, so that the purpose of adding the new node into the structured P2P network is achieved.

The specific step of completing, according to the node list returned by the registration node, registration of the new node may include:

in sub-step S131: acquiring a plurality of candidate nodes from the node list;

in sub-step S132: selecting, according to distances between the plurality of candidate nodes and the new node, the node list to determine a neighboring node; and in sub-step S133: storing node information of the new node to the neighboring node to complete registration of the new node, where the node information of the new node includes: the position hash value, a node port number, and a node identifier. The node information of the new node further includes a smart contract stored in the new node and a service resource packaged by the smart contract.

Figure 2:
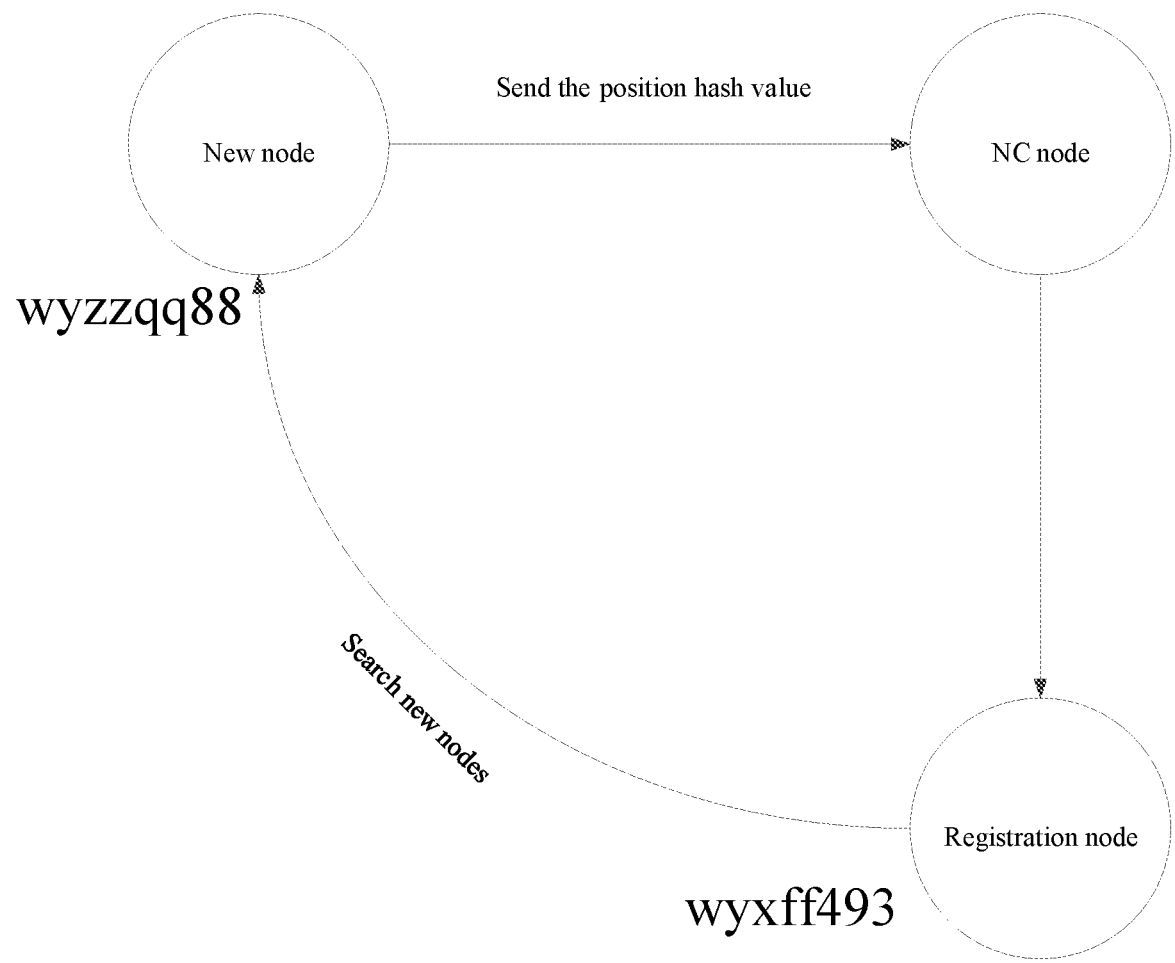
FIG. 2 is a flowchart of adding a new node into a topological structure of a structured P2P network in one example of the present application.

Table 1 is a preset relationship table in one example. FIG. 2 is a flowchart of adding a new node into a topological structure of a structured P2P network in one example of the present application. Referring to FIG. 2, in one example of the present application, the new node calculates a position hash value wyzzqq88 according to its longitudinal and latitude coordinates. The new node initiates a registration request to a node center node (also referred to as the NC node), and the NC node searches a hash value corresponding to a fuzzy keyword name of each resource network from a preset relationship table. For example, the previous 40 bits of the target resource network hash value wyxff493 have the highest similarity to the position hash value wyzzqq88. The NC node sends the target resource network hash value wyxff493 back to the new node, so as to take the existing node with the position hash value of wyxff493 in the structured P2P network as the registration node. The new node sends the registration request to the registration node wyxff493, so that the registration node initiates the reverse search for the new node. The registration node buffers, in a routing skip process, nodes that it passes through until the search is converged, and sends the node list of all the skip nodes to the new node. The new node carries out deduplication by itself after acquiring the node list, and stores, according to the distances, its node information to the corresponding list K-bucket.

TABLE 1

| Fuzzy keyword | NC node | |
| --- | --- | --- |
| | Corresponding resource network type | Returned hash value |
| Coffee | Coffee maker network jf4er | jf4er |
| Refrigerator | Refrigerator network | Wx4ff |

When the new node is a resource node, and a smart contract is packaged in the node, the node may be added into the structured P2P network together with a resource node having a correlation with this node by using a human-cyber-physical resource-oriented adaptive construction method for a structured P2P network provided in another embodiment of the present application, that is, the node is mapped to the Kademlia topological structure of the structured P2P network.

In one example of the present application, the resource node is a coffee maker; a smart contract that invokes the coffee maker is stored in computer A, and computer A is provided with an invoking interface for driving the coffee maker to provide a service; the smart contract packages the invoking interface; and computer A is a node that has a connection relationship with the resource node.

The method may include the specific steps:

Step S21: sending parameter information of the resource node to an NC node.

The resource node is a node to be connected to the structured P2P network. Specifically, the resource node may be an electrical device that provides a service or may be an electrical device that is connected to a computer. For example, the resource node may be a coffee maker, a washing machine, and the like, or may be a coffee maker or a washing machine that is connected with a computer, and a mobile terminal where deliverer information is registered.

The parameter information of the resource node includes a resource name, position information, and the like of the resource node.

In step S22: determining, by the NC node according to the parameter information, a resource network type to which the resource node belongs.

In step S23: acquiring a resource network hash value calculated, for the resource node, by the NC node.

The information node determines, according to the resource name, the resource network type of a resource node network to which the resource node belongs. In one example of the present application, the information node determines, according to the resource name: coffee, that the resource node belongs to the coffee maker network, and returns the hash value of the coffee maker network to the resource node to be added to the structured P2P network.

In step S24: determining, according to the resource network hash value, a hash value placement position of the resource node.

The method for mapping a resource node to one-dimensional storage space is consistent with the mapping method provided in the embodiments of the present application. A position hash value of the resource node needs to be acquired, and a node relatively closer to the resource node is found as a registration node, so as to use the registration node to complete the registration of the resource node.

For the same geographical scope, a plurality of different resource networks may be formed, which may specifically include a coffee machine resource network, a washing machine resource network, and a deliverer resource network. In the present application, the information of the resource network hash value and position hash value are combined according to the two hash values, so as to map the resource node to a corresponding position in the one-dimensional storage space. When the new node is added to the structured P2P network, and the resource network hash value returned by the NC node has the highest similarity with the position hash value of the new node, it can be determined that the actual geographic position of the new node is closest to a geographic region where the resource network is located, so nodes with the same hash values as that of the resource network can find new nodes within limited time.

The NC node determines, according to the resource network hash value, the placement position of the hash value of the resource node in the one-dimensional storage space. In one example of the present application, assuming hash ("node fuzzy keyword") = hash ("name hash value"), for example, assuming ("coffee") = hash ("coffee maker network"), the resource node is placed at a corresponding position in the one-dimensional storage space according to a geographic position of a coffee maker. In one territorial scope, all resource nodes belonging to a coffee maker network are aggregated, according to their same name hash values, in a specific range of one one-dimensional storage space (the Kademlia topological structure with physical perception) to form the coffee maker network. In the vicinity of the coffee maker, there will be nodes that are close to the resource node (coffee maker) in the geographic position, and some of these nodes store the smart contract of the resource node (coffee maker). The present application maps, according to their geographic position hash values, the nodes to corresponding positions in the one-dimensional storage space, and forms, according to resource node name hash values, a resource network.

In step S25: adding the resource node into the structured P2P network according to the hash value placement position.

Figure 3:
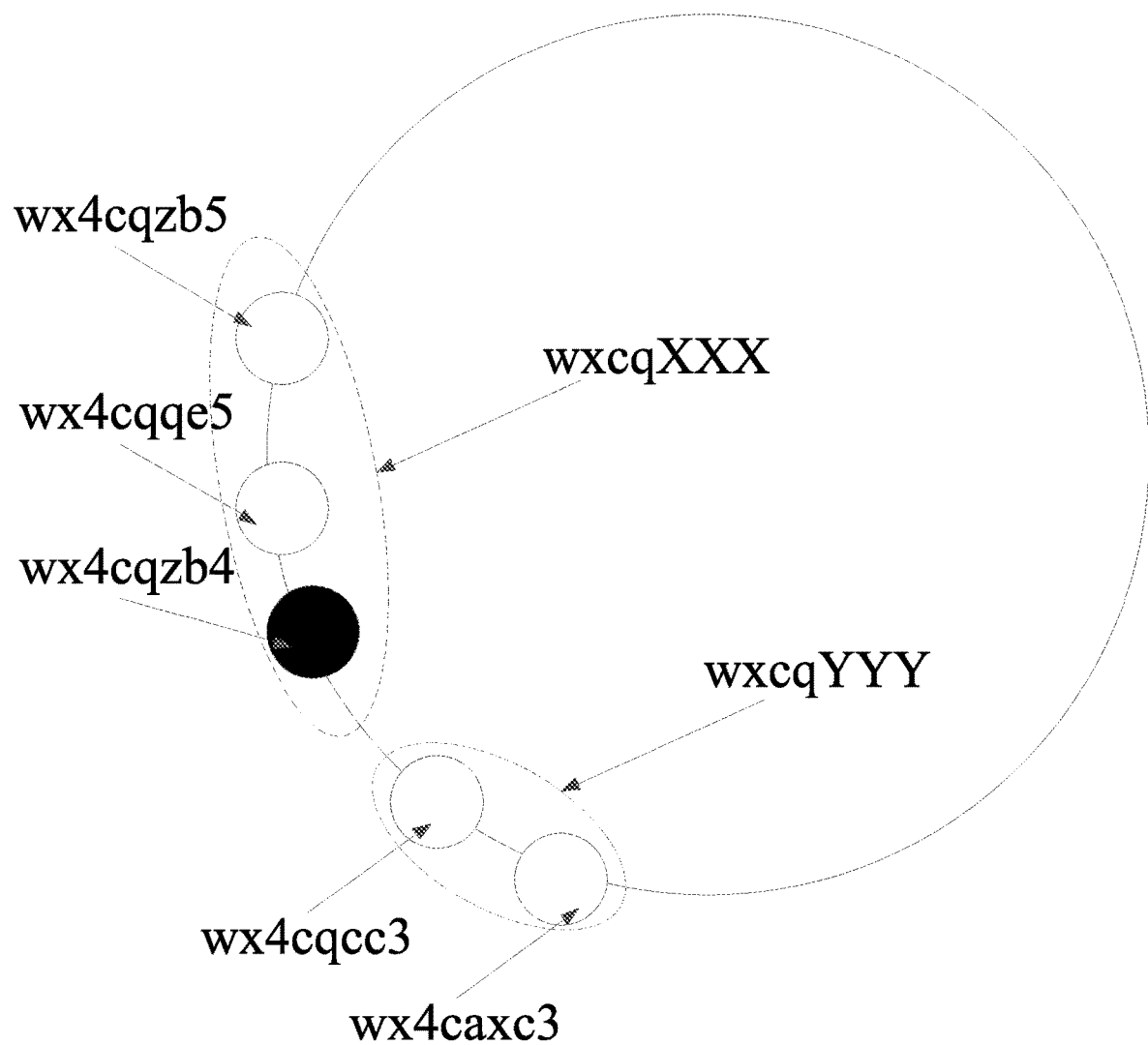
FIG. 3 is a schematic diagram of a Kademlia topological structure in one example of the present application.

FIG. 3 is a schematic diagram of a Kademlia topological structure in one example of the present application. The topological structure shown in FIG. 3 includes 5 nodes. The position hash value of coffee maker No. 2 located in city C is wx4cqzb5; the position hash value of coffee maker No. 3 located in city C is wx4cqqe5; and coffee maker No. 2 wx4cqzb5 and coffee maker No. 3 wx4cqqe5 are located in the coffee maker network of city C. The position hash value of washing machine No. 1 located in city C is wx4cqcc3, and the position hash value of washing machine No. 2 located in city C is wx4caxc3; and washing machine No. 1 wx4cqcc3 and washing machine No. 2 wx4caxc3 are located in the washing machine network of city C. The resource network hash value of the coffee maker network of city C is wx4cqXXX, and the resource network hash value of the washing machine network of city C is wx4cqYYY.

In one example of the present application, the position hash value of the resource node coffee maker No. 1 is wx4cqzb4. According to the position hash value wx4cqzb4, it can be determined that coffee maker No. 1 is mapped to a position of the one-dimensional storage space. The resource nodes belonging to the same resource network type can be gathered within the same scope according to the hash value placement positions. The NC node determines that the resource node belongs to the coffee maker network, and the NC node informs the resource node of the coffee maker network hash value wx4cqXXX; and it is determined, according to the wx4cqXXX, that the hash value placement position of the resource node is within the scope of the wx4cqXXX. The coffee maker network and the washing machine network exist in the same geographic region. The washing machine network hash value is wx4cqYYY. The hash value placement position is used for instructing the resource node to be placed at the position, corresponding to the coffee maker network, in the one-dimensional storage space, that is, instructing the resource node coffee maker 1 to be placed within the scope of the wx4cqXXX.

In the embodiments of the present application, a grid aggregation algorithm is used to calculate, according to the longitude and latitude coordinates of a new node, a position hash value of the new node; a node relatively closer to the new node is determined, according to the position hash value, from existing nodes of the structured P2P network; the relatively closer node is used as a registration node; the new node then sends a registration request to the registration node, so that the registration node performs a reverse search on the new node, thus obtaining a neighboring node of the new node in a geographic position; after the new node receives a node list of the neighboring node sent by the registration node, an actual neighboring node is selected out from the node list; and node information of the new node is stored to the neighboring node. A connection relationship between the new node and an existing node of the structured P2P network is established, and a storage structure for the new node in the structured P2P network is also established. Connection relationships and storage structures of all the nodes are established in sequence according to the above method, thus obtaining the structured P2P network. In the structured P2P network constructed in the above method, adjacent nodes are exactly nodes that are adjacent in actual geographic positions, and then a Kademlia distributed search method is used to initiate, at any node of the structured P2P network, a search for other nodes. Searched resource nodes are exactly nodes that are close in geographic positions, so services can be obtained in time. In this way, the problem in the current situation that it is hard for people to find nodes geographically close to them in the human-cyber-physical fusion scenario is solved.

Node X uses node Y's geographic position hash value as an index to maintain a local node list. For example, when node X needs to communicate with Node Y, node X traverses the list first. If the geographic position hash value of node Y is not found in the local node list, whether a neighboring node of node X stores the geographic position hash value of node Y is queried in sequence continuously by the Kademlia search method, until a node that stores the geographic position hash value of node Y is found. By the query response assistance of a plurality of nodes, it finally converges to node Y to complete the search.

Figure 4:
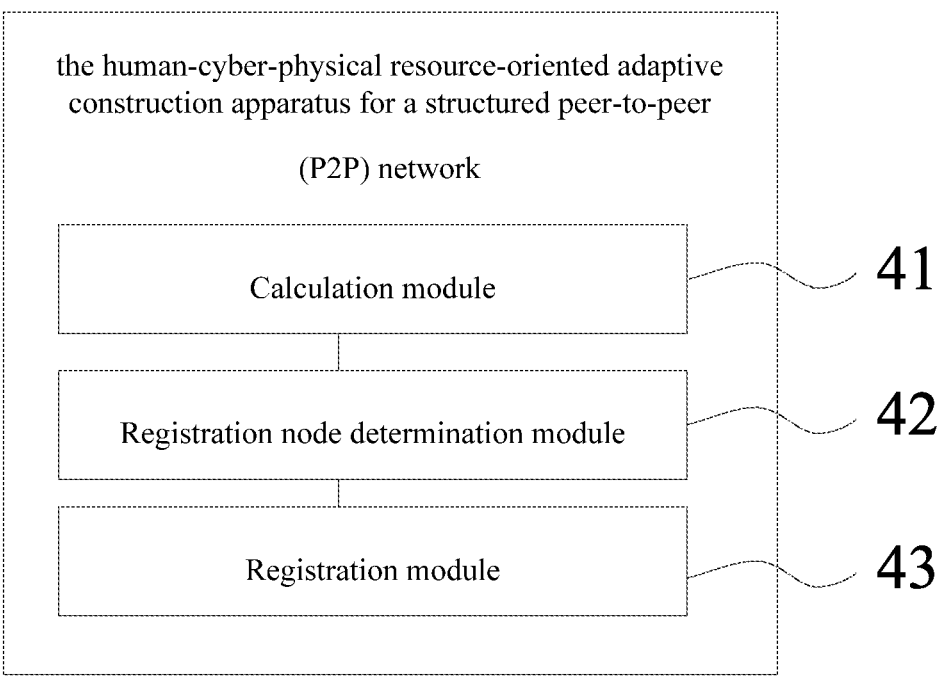
FIG. 4 illustrates functional modules of a human-cyber-physical resource-oriented adaptive construction apparatus for a structured P2P network provided in an embodiment of the present application.

Based on the same inventive concept, an embodiment of the present application provides a human-cyber-physical resource-oriented adaptive construction apparatus for a structured P2P network. FIG. 4 illustrates functional modules of a human-cyber-physical resource-oriented adaptive construction apparatus for a structured P2P network provided in an embodiment of the present application. As shown in FIG. 4, the apparatus includes:

a calculation module 41 configured to use a grid aggregation algorithm to calculate latitude and longitude coordinates of a new node to acquire a position hash value of the new node;

a registration node determination module 42 configured to determine, according to the position hash value, a registration node of the new node from existing nodes of the structured P2P network; and a registration module 43 configured to complete, according to the information returned by the registration node to the new node, registration of the new node, and add the registered new node into the structured P2P network.

Optionally, the apparatus further includes:

a driving module configured to drive the registration node to initiate a reverse search for the new node; and a recording module configured to record, by the registration node, a node list of a skip node, where the skip node is at least one node that the registration node passes through in the process of searching the new node; and the registration module includes:

a first registration sub-module configured to complete, according to the node list returned by the registration node, registration of the new node.

Optionally, the registration sub-module includes:

an acquisition unit configured to acquire a plurality of candidate nodes from the node list;

a selecting unit configured to select, according to distances between the plurality of candidate nodes and the new node, the node list to determine a neighboring node; and a storage unit configured to store node information of the new node to the neighboring node to complete registration of the new node, where the node information of the new node includes: the position hash value, a node port number, and a node identifier.

Optionally, the apparatus further includes:

a sending module configured to send parameter information of the resource node to an NC node;

a network type determination module configured to determine, by the NC node according to the parameter information, a resource network type to which the resource node belongs;

an acquisition module configured to acquire a resource network hash value calculated, for the resource node, by the NC node; and an information determination module configured to determine, according to the resource network hash value, a hash value placement position of the resource node; and the registration module includes:

a second registration sub-module configured to add, according to the hash value placement position, the resource node into the structured P2P network.

Optionally, the registration node determination module includes:

a sending sub-module configured to send the position hash value to an NC node that stores a plurality of resource network hash values;

a hash value determination sub-module configured to determine, by the NC node according to the position hash value, a target resource network hash value from the plurality of resource network hash values; and a registration node determination sub-module configured to determine a node with the target resource network hash value as the registration node.

For the apparatus embodiment, since it is basically similar to the method embodiment, the description is relatively simple, and reference may be made to partial description of the method embodiment for related parts.

All the embodiments in the present specification are described in a progressive or illustrative manner. Contents mainly described in each embodiment are different from those described in other embodiments. Same or similar parts of all the embodiments refer to each other.

Those skilled in the art should understand that the embodiments of the present application may provide a method, an apparatus, or a computer program product. Therefore, the embodiments of the present invention may adopt the form of a complete hardware embodiment, a complete software embodiment, or a software and hardware combination embodiment. In addition, the embodiments of the present invention may adopt the form of a computer program product implemented on one or multiple computer-sensitive storage media (including, but not limited to, a magnetic disk memory, a Compact Disc Read-Only Memory (CD-ROM), optical memory and the like) including computer-sensitive program codes.

The embodiments of the present application are described by referring to flowcharts and/or block diagrams of methods, apparatuses, and computer program products according to the embodiments of the present application. It should be understood that computer program instructions may implement each flow and/or each block in the flow diagrams and/or the block diagrams and combination of the flows and/or the blocks in the flow diagrams and/or the block diagrams. These computer program instructions may be provided for a general computer, a dedicated computer, an embedded CPU, or processing units of other programmable data processing terminal devices to generate a machine, thereby making the instructions that are executed by the computer or the processing units of other programmable data processing terminal devices generate apparatuses for realizing specified functions in one or more flows in the flowcharts and/or in one or more blocks in the block diagrams.

These computer program instructions can also be stored in a computer-readable memory that can instruct the computer or other programmable data processing terminal devices to work in a specific way, so that the instructions stored in the computer-readable memory generate a product that includes an instruction apparatus. The instruction apparatus implements a specified function in one or more flows in the flow charts and/or in one or more blocks in the block diagrams.

These computer program instructions can also be loaded onto the computer or another programmable data processing device, so that a series of operation steps are performed on the computer or another programmable terminal device, thereby generating computer-implemented processing. Therefore, the instructions executed on the computer or other programmable terminal devices provide steps for implementing a specified function in one or more flows in the flow charts and/or in one or more blocks in the block diagrams.

Although the preferred embodiments of the present application have been described, those skilled in the art can make other changes and modifications to these embodiments once they acquire the basic creative concept. Therefore, the attached claims are intended to be explained as including the preferred embodiments and all the changes and modifications that fall within the scope of the embodiments of the present application.

It should also be finally noted that in this context, the relational terms "first", "second" and the like are used merely to distinguish one entity or operation from another entity or operation, instead of necessarily requiring or implying that these entities or operation have any of these actual relationships or orders. Furthermore, the terms "include", "contain"or any other variants are meant to cover non-exclusive inclusions, so that a process, method, object, or terminal device that includes a series of elements not only includes those elements, but also includes other elements which are not definitely listed, or further includes inherent elements of this process, method, object, or terminal device. Without more restrictions, elements defined by the phrase "includes a/an . . . " do not exclude that the process, method, object, or terminal device that includes the elements still includes other identical elements.

The human-cyber-physical resource-oriented adaptive construction method and apparatus for the structured P2P network provided by the present application have been described above in detail, and the descriptions of the above embodiments are only used to help understand the method and its core idea of the present application. At the same time, for those ordinarily skilled in the art, according to the idea of the present application, there will be changes in both the specific implementation and application scope. In summary, the content of this specification should not be construed as a limitation to the present application.

What is claimed is:

1. A human-cyber-physical resource-oriented adaptive construction method for a structured peer to peer (P2P) network, wherein the method comprises:
calculating latitude and longitude coordinates of a new node using a grid aggregation algorithm and acquiring a position hash value of the new node;
determining, according to the position hash value, a registration node of the new node from existing nodes of the structured P2P network; and
completing, according to information returned by the registration node to the new node, registration of the new node to obtain a registered new node, and adding the registered new node into the structured P2P network;
wherein after determining the registration node of the new node, the method further comprises:
driving the registration node to initiate a reverse search for the new node; and
recording, by the registration node, a node list of a skip node, where the skip node is at least one node that the registration node passes through in a process of searching the new node; and
wherein the step of completing, according to the information returned by the registration node, the registration of the new node comprises:
completing, according to the node list returned by the registration node, the registration of the new node.

2. The human-cyber-physical resource-oriented adaptive construction method for the structured P2P network according to claim 1, wherein the step of completing, according to the node list returned by the registration node, the registration of the new node comprises:
acquiring a plurality of candidate nodes from the node list;
selecting, according to distances between the plurality of candidate nodes and the new node, the node list to determine a neighboring node; and
storing node information of the new node to the neighboring node to complete the registration of the new node, wherein the node information of the new node comprises: the position hash value, a node port number, and a node identifier.

3. The human-cyber-physical resource-oriented adaptive construction method for the structured P2P network according to claim 1, wherein when the new node is a resource node, the method further comprises:
sending parameter information of the resource node to a node center (NC) node;
determining, by the NC node according to the parameter information, a resource network type of the resource node;
acquiring a resource network hash value calculated, for the resource node, by the NC node; and
determining, according to the resource network hash value, a hash value placement position of the resource node; and
wherein the step of adding the registered new node into the structured P2P network comprises:
adding the resource node into the structured P2P network according to the hash value placement position.

4. The human-cyber-physical resource-oriented adaptive construction method for the structured P2P network according to claim 1, wherein the step of determining, according to the position hash value, the registration node of the new node from the existing nodes of the structured P2P network comprises:
sending the position hash value to an NC node, wherein a plurality of resource network hash values is stored in the NC node;
determining, by the NC node according to the position hash value, a target resource network hash value from the plurality of resource network hash values; and
determining a node with the target resource network hash value as the registration node.

5. A human-cyber-physical resource-oriented adaptive construction apparatus for a structured P2P network, wherein the apparatus comprises:
a memory in which a computer-readable code is stored; and
one or more processors, wherein when the computer-readable code is executed by the one or more processors, the apparatus adapts to the operations comprising:
calculating latitude and longitude coordinates of a new node using a grid aggregation algorithm and acquire a position hash value of the new node;
determining, according to the position hash value, a registration node of the new node from existing nodes of the structured P2P network: and
completing, according to information returned by the registration node to the new node, registration of the new node to obtain a registered new node, and add the registered new node into the structured P2P network;
wherein after determining the registration node of the new node, the apparatus further adapts to the operations comprising:
driving the registration node to initiate a reverse search for the new node; and
recording, by the registration node, a node list of a skip node, wherein the skip node is at least one node that the registration node passes through in a process of searching the new node; and
wherein the operation of completing, according to information returned by the registration node to the new node, registration of the new node to obtain a registered new node, and add the registered new node into the structured P2P network comprising:
completing, according to the node list returned by the registration node, the registration of the new node.

6. The human-cyber-physical resource-oriented adaptive construction apparatus for the structured P2P network according to claim 5, wherein the operation of completing, according to the node list returned by the registration node, the registration of the new node comprising:
acquiring a plurality of candidate nodes from the node list;
selecting, according to distances between the plurality of candidate nodes and the new node, the node list to determine a neighboring node; and
storing node information of the new node to the neighboring node to complete the registration of the new node, wherein the node information of the new node comprises: the position hash value, a node port number, and a node identifier.

7. The human-cyber-physical resource-oriented adaptive construction apparatus for the structured P2P network according to claim 5, wherein the apparatus further adapts to the operations comprising:
sending parameter information of a resource node to an NC node;

determining, by the NC node according to the parameter information, a resource network type of the resource node;

acquiring a resource network hash value calculated, for the resource node, by the NC node; and determining, according to the resource network hash value, a hash value placement position of the resource node; and wherein the operation of completing, according to information returned by the registration node to the new node, registration of the new node to obtain a registered new node, and add the registered new node into the structured P2P network comprises:

adding, according to the hash value placement position, the resource node into the structured P2P network.

8. The human-cyber-physical resource-oriented adaptive construction apparatus for the structured P2P network according to claim 5, wherein the operation of determining, according to the position hash value, a registration node of the new node from existing nodes of the structured P2P comprising:

sending the position hash value to an NC node, wherein a plurality of resource network hash values is stored in the NC node;

determining, by the NC node according to the position hash value, a target resource network hash value from the plurality of resource network hash values; and determining a node with the target resource network hash value as the registration node.

\* \* \* \* \*